US008146890B2

(12) United States Patent
Lin et al.

(10) Patent No.: US 8,146,890 B2

(45) Date of Patent: Apr. 3, 2012

(54) DEVICE FOR TRANSPORTING PLANAR SOFC STACK

(75) Inventors: Hung-Hsiang Lin, Taoyuan County (TW); Ruey-Yi Lee, Taoyuan County (TW); Yung-Neng Cheng, Taoyuan County (TW)

(73) Assignee: Institute of Nuclear Energy Research Atomic Energy Council, Executive Yuan, Taoyuan County (TW)

( * ) Notice: Subject to any disclaimer, the term of this patent is extended or adjusted under 35 U.S.C. 154(b) by 454 days.

(21) Appl. No.: 12/465,850

(22) Filed: May 14, 2009

(65) Prior Publication Data

US 2010/0096607 A1 Apr. 22, 2010

(30) Foreign Application Priority Data

Oct. 21, 2008 (TW) ................................ 97140342 A

(51) Int. Cl.
*B62B 3/06* (2006.01)

(52) U.S. Cl. ........... 254/2 B; 254/4 B; 254/4 R; 254/3 B

(58) Field of Classification Search .................. 254/2 B, 254/4 B, 4 R, 3 B, 324–327; 403/296, 303, 403/307; 73/761, 862.393

See application file for complete search history.

(56) References Cited

U.S. PATENT DOCUMENTS

| | | | | |
|---|---|---|---|---|
| 2,552,927 | A * | 5/1951 | Benisek et al. | 212/180 |
| 2,857,193 | A * | 10/1958 | Heppenstall | 294/67.31 |
| 4,494,455 | A * | 1/1985 | Schoch | 101/3.1 |
| 4,899,986 | A * | 2/1990 | Tweedy | 254/8 B |
| 6,050,548 | A * | 4/2000 | Leger | 254/326 |
| 6,202,868 | B1 * | 3/2001 | Murray | 212/294 |
| 7,360,262 | B2 * | 4/2008 | Mowery | 5/87.1 |
| 7,373,846 | B2 * | 5/2008 | Furukawa et al. | 73/862.621 |
| 7,611,126 | B2 * | 11/2009 | Vesa | 254/93 H |
| 2008/0282511 | A1 * | 11/2008 | Chou et al. | 24/135 R |

* cited by examiner

*Primary Examiner* — Monica Carter
*Assistant Examiner* — Melanie Alexander
(74) *Attorney, Agent, or Firm* — WPAT., P.C.; Justin King

(57) ABSTRACT

A device, adapted for transporting a planar solid oxide fuel cell stack while the SOFC stack is sandwiched between a top plate and a bottom plate, which comprises: a plurality of load units, a lifting unit and a mobile seat. Each of the plural load devices is adapted for exerting a pressure on the SOFC stack. The lifting unit is composed of a joint portion and a plurality of cantilevers. In an exemplary, there is a fixing part arranged at the end of each cantilever while being enabled to connect to the SOFC stack by the bottom thereof. With the aforesaid device, the SOFC stack can be moved out of a high temperature furnace and then into a fuel cell control system smoothly while keeping one's balance without worrying the SOFC stack being damaged or tipping over by collision or losing balance.

17 Claims, 4 Drawing Sheets

DEVICE FOR TRANSPORTING PLANAR SOFC STACK

FIELD OF THE INVENTION

The present invention relates to a solid oxide fuel cell (SOFC) stack transportation device, and particularly, to a device adapted for moving a SOFC stack out of a high temperature furnace and then into a fuel cell control system smoothly while capable of keeping one's balance without worrying the SOFC stack being damaged or tipping over by collision or losing balance, so that the SOFC stack is transported safely from the high temperature furnace to the fuel cell control system.

BACKGROUND OF THE INVENTION

The scope of solid oxide fuel cell (SOFC) applications to industry had been widen rapidly in recent years. This is because it can provide many advantages over traditional energy conversion systems including: tolerant to high temperature, high energy conversion efficiency, environmental friendly, and so on. It is noted that for preparing any common fuel cell for performance test or generating electricity, its fuel as well as air streams must be preheated to a designated operating temperature, which can be as high as 600° C. to 1000° C. for SOFCs, before they can be fed into the fuel cell stack.

Conventionally, such preheating is performed in a manner that: after the assembling of a SOFC stack is completed, it is being subjected to a load for stabilizing the same from tipping over for preparing the same to be move into a high-temperature furnace where it is heated to its designated operating temperature; and then, after performing a performance test upon the heated SOFC stack, it is cooled down and then moved out of the furnace manually to enter a control system while still under the stabilization of the load. However, it is noted that the whole transportation process of the SOFC stack must be performed with extreme care for preventing the SOFC stack from being damaged by tipping over, accidental collision or dropping.

As the combined weight of the SOFC stack and its load can be too heavy to be move manually and at the same time trying to prevent the same from being damaged by tipping over, accidental collision or dropping, the use of any conventional manual method for transporting SOFC stack can be a vary task. Not to mention that there is not yet any removal device capable of removing SOFC stacks out of the high temperature furnace smoothly and stably. Therefore, it is in need of a device for transporting SOFC stacks safely and smoothly.

SUMMARY OF THE INVENTION

In view of the disadvantages of prior art, the object of the present invention is to provide a cell stack transportation device, adapted for moving a cell stack out of a high temperature furnace and then into a fuel cell control system smoothly and stably while capable of keeping one's balance without worrying the cell stack being damaged or tipping over by collision or losing balance, so that the cell stack is transported safely from the high temperature furnace to the fuel cell control system.

To achieve the above object, the present invention provides a device, adapted for transporting a cell stack while the cell stack is sandwiched between a top plate and a bottom plate, which comprises: a plurality of load units, a lifting unit and a mobile seat. Each of the plural load devices is adapted for exerting a pressure on the cell stack. The lifting unit is composed of a joint portion and a plurality of cantilevers in a manner that the plural cantilevers are arranged centering the joint portion while extending radially outward therefrom. In an exemplary, there is a fixing part being arranged at the end of each cantilever while being enabled to connect to the cell stack by the bottom thereof. Moreover, the movable seat further includes a crane, which is adapted for connecting to the lifting unit for enabling the lifting unit and the cell stack to be moved with the moving of the mobile seat.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 1:
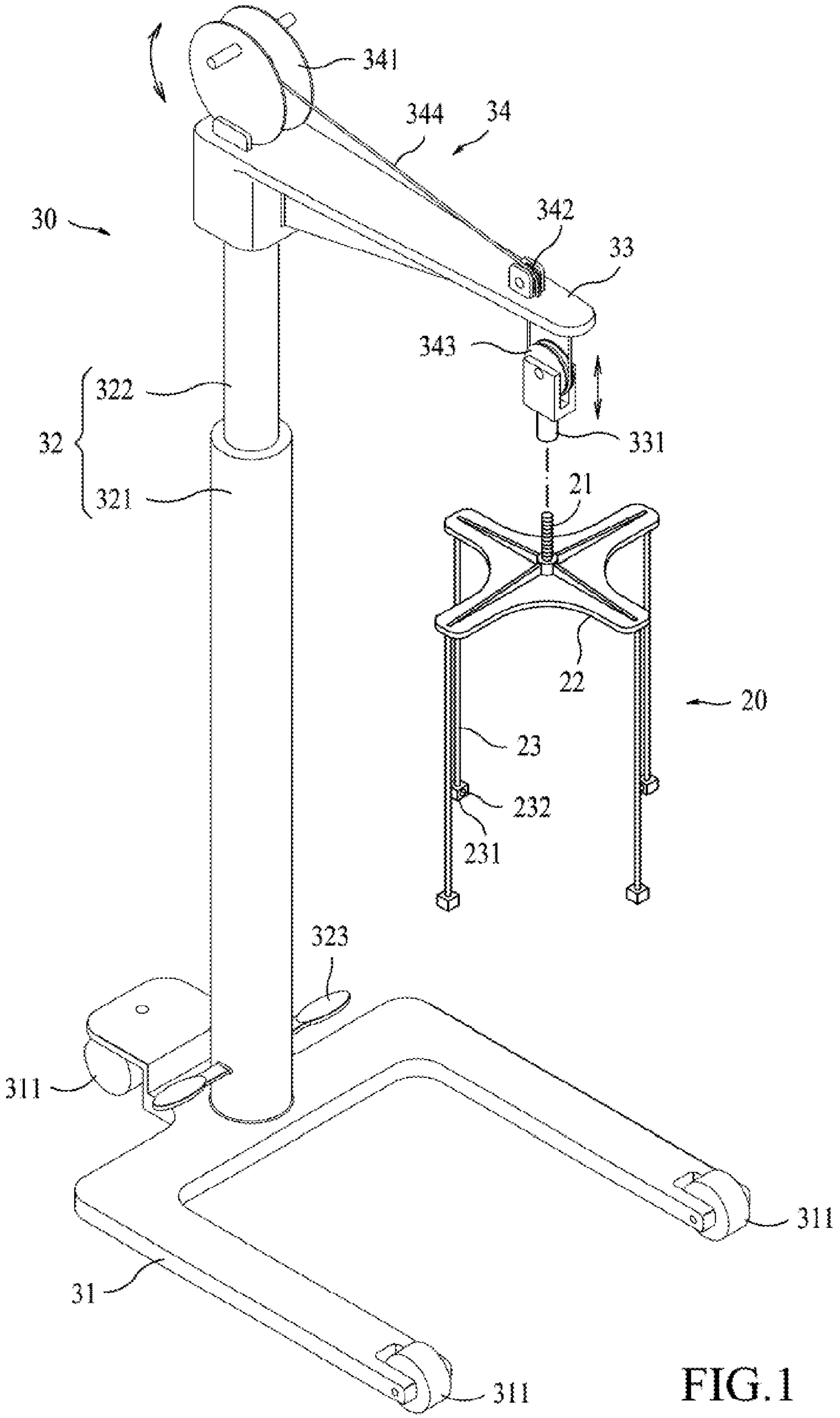
FIG. 1 is a three-dimensional diagram showing a lifting unit and a mobile seat used in a cell stack transportation device of the invention.
Figure 2:
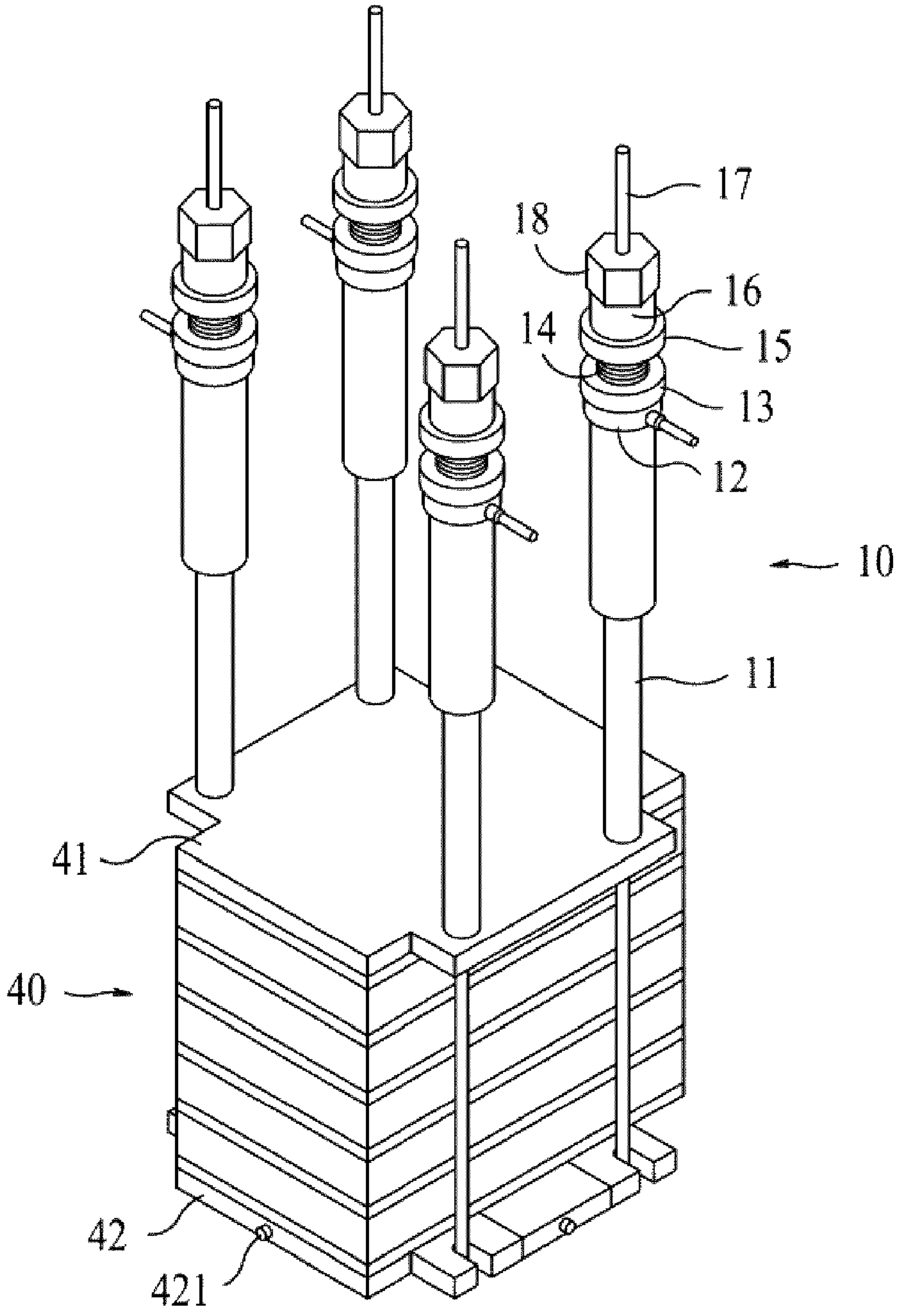
FIG. 2 is a three-dimensional view of a load unit according to an exemplary embodiment of the invention with respect to how it is applied to a cell stack.

As shown in FIG. 1 and FIG. 2, the cell stack transportation device of the invention comprises: a plurality of load units 10, a lifting unit 20 and a mobile seat 30. Each of the plural load units 10 is adapted for exerting a pressure on a cell stack, as shown in FIG. 2, while the cell stack 40 is sandwiched between a top plate 41 and a bottom plate 42. Each of the load unit is comprised of a pressure column 11, a load cell 12, a lower compressing ring 13, an elastic member 14, an upper compressing ring 15, a pressure balance ring 16, and a screw rod 17, in which the pressure column 11 is arranged abutting against the top of the top plate 41 while sequentially stacking the load cell 12, the lower compressing ring 13, the elastic member 14, the upper compressing ring 15 and the pressure balance ring 16 one on the other from bottom up, and arranging the screw rod 17 to piece through the centers of the pressure column 11, the load cell 12, the lower compressing ring 13, the elastic member 14, the upper compressing ring 15 and the pressure balance ring 16 before it is screwed to a screw nut 18. The load cell 12 is used for measuring and calculating a load; and the elastic member is used as a buffer which can be a disc spring in this embodiment. The upper and the lower compressing rings 13, 15 are respectively disposed on the top and the bottom of the elastic member 14, by which the elastic member is fixed. The pressure balance ring 16 is used for supporting the load of the load cell 12 for uniformly distributing the pressing of the load. It is noted that the load cell 12 can be any commercial product available on the market that is able to exerting a load specified in the device of the invention; and the pressure column 11, the lower compressing ring 13, the upper compressing ring 15 and the pressure balance ring 16 are all made of steel such as SS 304, SS 310, etc.

As shown in FIG. 1, the lifting unit 20 further comprises: a joint portion 21; and a plurality of cantilevers 22, arranged centering the joint portion 21 while extending radially outward therefrom. In this embodiment, the joint portion 21 is a stud with outer screw thread, and the plural cantilevers 22, as there are four in FIG. 1, are equiangularly spaced around the joint portion 21. Moreover, each cantilever 22 is configured with a fixing part 23 which can be a rod, having a top for connecting to its corresponding cantilever 22, and a bottom configured with a location block 231 while the location block 231 is further configured with a recess 232 provided for one protrusion 421 selected from a plurality of protrusions 421 formed on the rim of the bottom plate 42 to inset therein.

The mobile seat 30 further comprises a base 31, a post 32 and a crane 33. The base 31 is configured with a plurality of wheels 311 for enabling the base 31 to slide. The post 32 is disposed on the base 31 that it is composed of a first column 321 and a second column 322 in a manner that the two columns 321, 322 are coaxially arranged for enabling any one selected of the two to be ensheathed by the other while allowing the two to rotate axially in relative to one another. In this embodiment, the first column 321 is a hollow pillar fixedly secured on the base 31 for axially ensheathing the second column 322 while the second column 322 is connected to a driving device for driving the same to move reciprocatively along an axial direction of the second column 322. It is noted that the driving device can be a device selected from the group consisting of: a hydraulic device, a pneumatic device and an electrical driving device. As shown in FIG. 1, the driving device is connected to a pedal 323, provided for an operator to step on so as to control the driving device to drive the second column 322 to move reciprocatively along the axial direction, and thereby, the first column 321 and the second column 322 are enabled to move up and down along the axes of the two in relative to one another.

The crane 33 is mounted on the post 32 in a manner that it is extending transversely with respect to the axis of the post 32 by a specific length. In this embodiment, the crane 33 further includes a connect 331 for connecting to the joint portion 21 of the lifting unit 20, that the connect 331 is configured with an inner screw thread for screw-mating with the outer screw thread of the joint portion 21. Furthermore, the connect 331 is connected to a pulley set 34 while the pulley set 34 is further comprises of a plurality of pulleys 341, 342, 343 and a rope 344. As the rope 344 is connected to the connect 331, the connect 331 can be brought along to move with the movement of the rope 344 when the rope is driven to move by the rotation of the pulleys 341.

Figure 3:
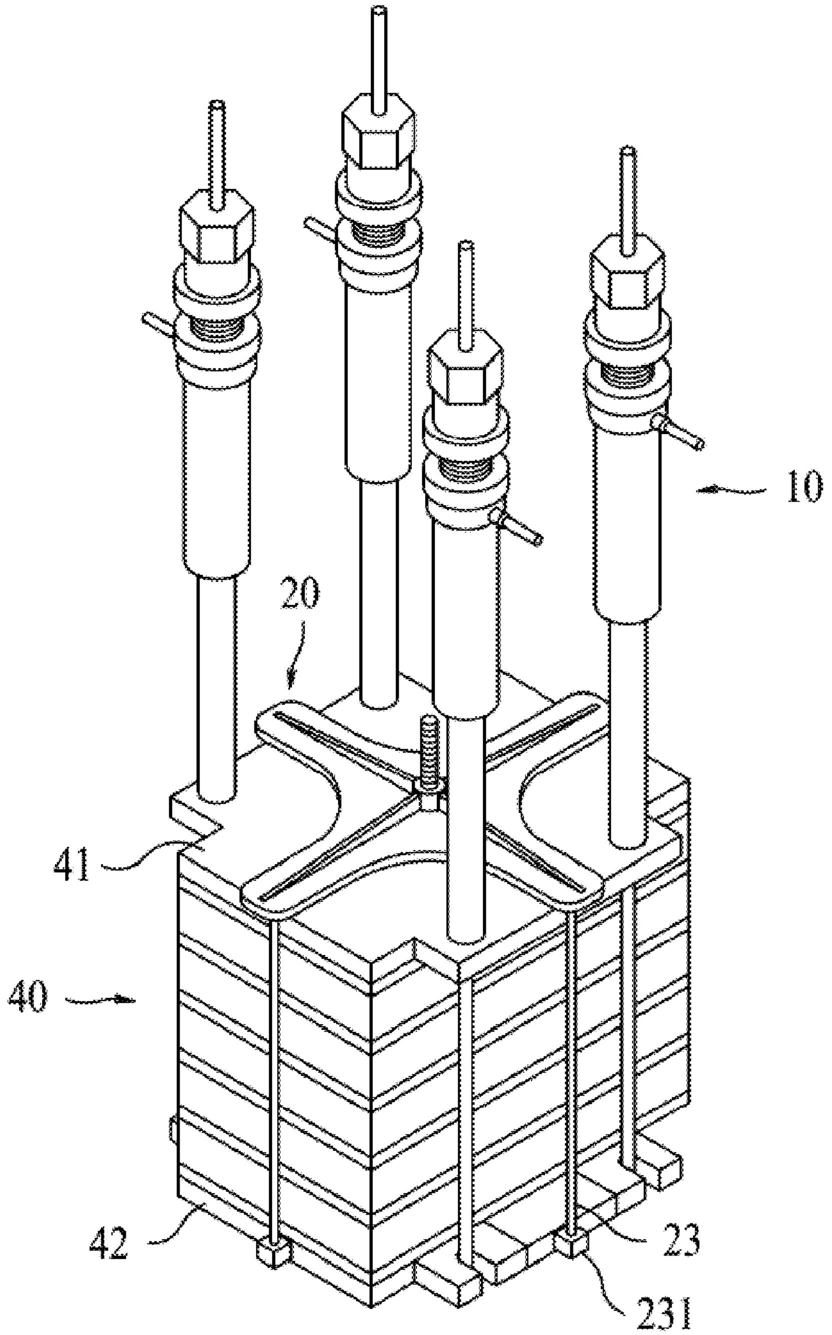
FIG. 3 is a three-dimensional view of a lifting unit according to an exemplary embodiment of the invention with respect to how it is applied to the cell stack of FIG. 2.
Figure 4:
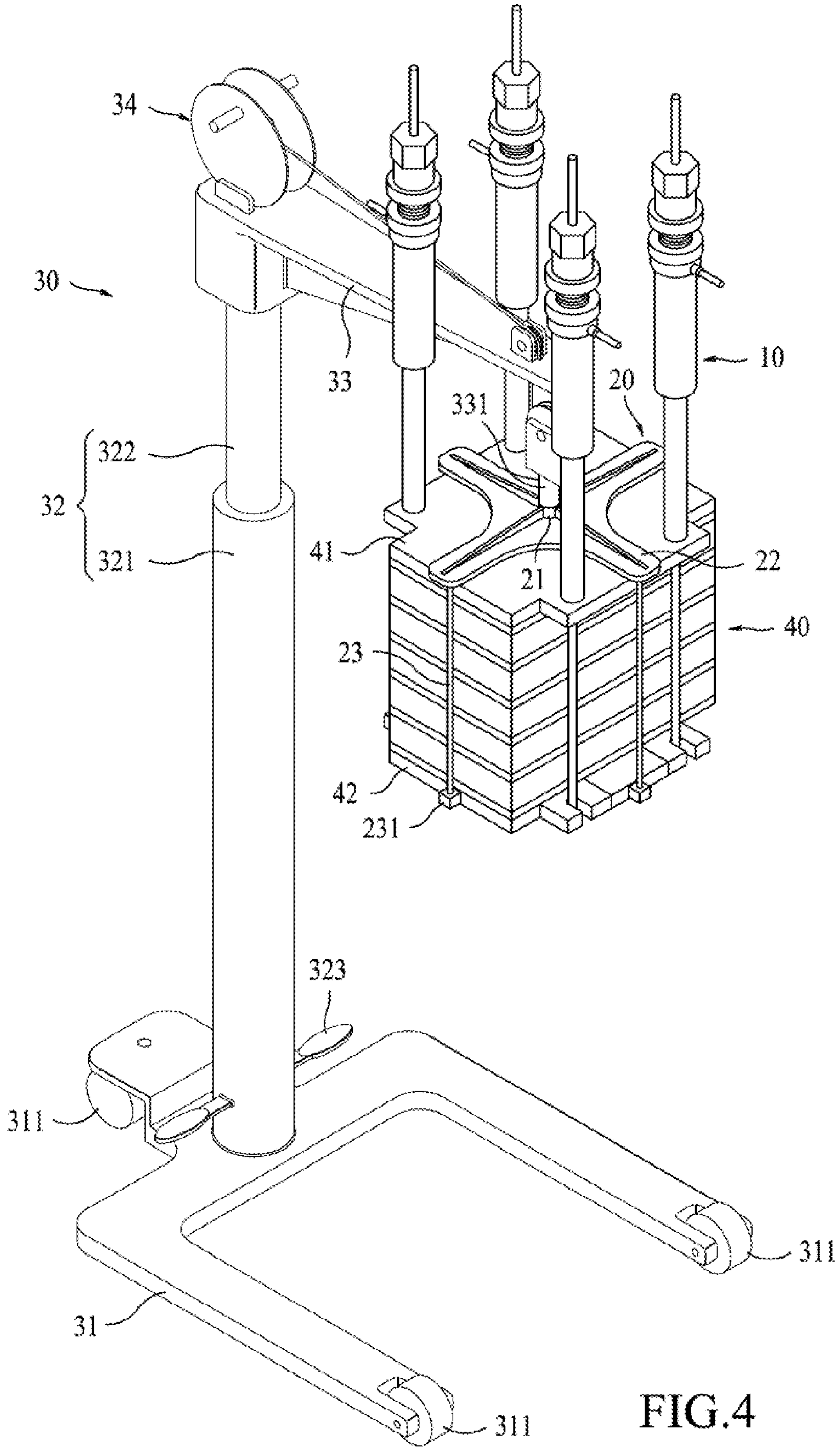
FIG. 4 is a three-dimensional diagrams showing how the cell stack of FIG. 2 can be hanged by the use of the lifting unit and the mobile seat of FIG. 1.

After the cell stack completes a deformation treatment in the high-temperature furnace and the temperature of the furnace had already dropped to room temperature, the cell stack 40 is secured by the four loading units 10, as shown in FIG. 2. As the four loading units 10 are evenly located with respect to the cell stack 40 to be used for tightly sandwiching the cell stack 40 between the top plate 41 and the bottom plate 42, the cell stack 40 is prevented from deforming. Thereafter, by insetting the protrusions 421 formed on the rim of the bottom plate 42 into their corresponding recesses 232 formed on the location blocks of the plural fixing part 23, the cell stack 40 is connected to the lifting unit 20, as shown in FIG. 3. Then, the lifting unit 20 is connected to the crane 33 by connecting the joint portion 21 of the lifting unit 20 to the connect 331 of the crane 33, as shown in FIG. 4. For enabling the joint portion 21 to screwed to the connect 331 properly, the crane 33 should be positioned at a location meeting with that of the lifting unit 20 which can be realized by the use of the plural wheels 311 to move the mobile seat 30, cooperating with the adjusting the height of the second column 322. After the cell stack is securely connected to the lifting unit 20 and the lifting unit 20 is further securely connected to the crane 33, the mobile seat 30 can be control to move the cell stack 40 of the high-temperature furnace and into the control system.

To sum up, the cell stack transportation device is capable of moving a cell stack out of a high temperature furnace and into a control system smoothly and stably while ensuring the deformation of the cell stack to be maintained under a specific threshold.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A device, adapted for transporting a cell stack while the cell stack is sandwiched between a top plate and a bottom plate, comprising:

- a plurality of load units, each adapted for exerting a pressure on the cell stack;
- a lifting unit, composed of a joint portion and a plurality of cantilevers in a manner that the plural cantilevers are arranged centering the joint portion while extending radially outward therefrom, each having a fixing part arranged at the end thereof to be used for connecting to the cell stack by the bottom thereof; and
- a mobile seat, further comprising a crane, adapted for connecting to the lifting unit for enabling the lifting unit and the cell stack connected thereto to be moved with the moving of the mobile seat;
- wherein each load device further comprises:
  - a pressure column, being arranged abutting against the top of the top plate;
  - a load cell, arranged on the top of the pressure column;
  - an elastic member, arranged on the top of the load cell;
  - a pressure balance ring, arranged on the top of the elastic member;
  - a screw rod, arranged in a manner that it pieces through the centers of the pressure column, the load cell, the elastic member, and the pressure balance ring; and
  - a screw nut, capable of being screwed to the screw rod.

2. The device of claim 1, wherein the mobile further comprises:

- the crane;
- a base; and
- a post, disposed on the base for the crane to be mounted thereon while extending transversely with respect to the axis of the post by a specific length.

3. The device of claim 2, wherein the crane further comprises:

- a connect, for connecting to the joint portion of the lifting unit.

4. The device of claim 3, wherein the connect is connected to the joint portion by a screwing manner.

5. The device of claim 4, wherein the connect is configured with an inner screw thread and the joint portion is a stud with outer screw thread.

6. The device of claim 3, further comprising:

a pulley set, including a plurality of pulleys and a rope connected to the connect;

wherein, the rope is enabled to move along with the rotation of the pulleys while the connect is brought along to move with the movement of the rope.

7. The device of claim 6, wherein the connect is configured to move up and down along the movement of the rope.

8. The device of claim 2, wherein the post is composed of a first column and a second column in a manner that the two columns are coaxially arranged for enabling any one selected of the two to be ensheathed by the other while allowing the two to rotate axially in relative to one another.

9. The device of claim 8, wherein the first column is a hollow pillar fixedly secured on the base for axially ensheathing the second column.

10. The device of claim 9, wherein the second column is connected to a driving device for driving the same to move reciprocatively along an axial direction of the second column.

11. The device of claim 10, wherein the driving device is a device selected from the group consisting of: a hydraulic device, a pneumatic device and an electrical driving device.

12. The device of claim 8, wherein the first column and the second column are designed to move up and down along the axes of the two in relative to one another.

13. The device of claim 2, wherein the base is configured with a plurality of wheels for enabling the base to slide.

14. The device of claim 1, wherein each fixing part of the lifting unit is a rod, having a top for connecting to its corresponding cantilever, and a bottom configured with a location block; and the location block is further configured with a recess provided for one protrusion selected from a plurality of protrusions formed on a rim of the bottom plate to inset therein.

15. The device of claim 1, wherein the elastic member is a disc spring.

16. The device of claim 1, wherein there are a lower compressing ring arranged at the bottom of the elastic member and an upper compressing ring arranged at the top of the elastic member.

17. The device of claim 16, wherein the pressure column, the lower compressing ring, the upper compressing ring and the pressure balance ring are all made of steel.

* * * * *